Dec. 20, 1960 A. M. BERGGREEN Re. 24,910

READING APPARATUS FOR THE BLIND

Original Filed Nov. 13, 1952 4 Sheets-Sheet 1

Alf M. Berggreen

By Lawson & Beaman

READING APPARATUS FOR THE BLIND

Original Filed Nov. 13, 1952 4 Sheets-Sheet 2

Alf M. Berggreen
By Lawrence & Beaman

READING APPARATUS FOR THE BLIND

Original Filed Nov. 13, 1952 4 Sheets-Sheet 3

Alf M. Berggreen

By Lawson & Beaman

READING APPARATUS FOR THE BLIND

Original Filed Nov. 13, 1952 4 Sheets-Sheet 4

AH M Berggreen

By James A. Beaman

United States Patent Office

Re. 24,910
Reissued Dec. 20, 1960

24,910

READING APPARATUS FOR THE BLIND

Alf M. Berggreen, Brattvollveien 23, Nordstrandshogda, near Oslo, Norway

Original No. 2,808,661, dated Oct. 8, 1957, Ser. No. 320,322, Nov. 13, 1952. Application for reissue Nov. 21, 1958, Ser. No. 776,166

10 Claims. (Cl. 35—35)

Figure 1:
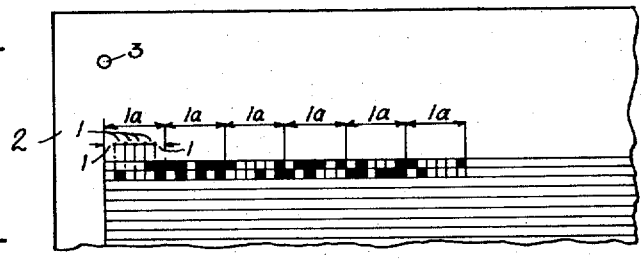

Matter enclosed in heavy brackets [ ] appears in the original patent but forms no part of this reissue specification; matter printed in italics indicates the additions made by reissue.

The present invention relates to a system which makes it possible for blind persons to read manuscripts produced by a usual printing operation on sheets, such as paper sheets.

A book or a manuscript for blind persons in relief or point writing after the Braille system usually weighs approximately 30 times more than the same manuscript in ordinary book print, has about 15 times greater volume and is approximately 20 times more expensive to produce. Storing of writings for blind persons of the type referred to requires therefore excessive space and shipment thereof is expensive. For that reason only a limited amount of the literature is available for use by blind persons, and each book is expensive. The reading of the reliefs or points by searching with the tip of a finger during continuous movement of the hand is tiresome as it is difficult to support the forearm, at the same time as a greater or smaller sensibility in the finger tip is of vital importance for the reading. The present invention aims to remove the above mentioned drawbacks and the main object of the invention is to provide a manuscript, which may be produced by an ordinary printing operation, so that said manuscript as to volume, weight and cost of production corresponds to or even succumbs a corresponding book printed in usual manner.

A further object is to provide a manuscript on which the letters are represented by fields in accordance with the points in Braille's point writing system and are arranged in such a manner that by an intermediate scanning device, the manuscript can be employed to control a touch apparatus having a number of impulse members corresponding to the number of points in said system, which members transmit tangible impulses in accordance with the points of a scanned letter.

A still further object is to provide a touch apparatus which is able to react against the body of a person, preferably against one of the hands, while resting on a convenient supporting base and thus requires no movement.

A still further object is to provide an apparatus by means of which the scanning device, supported at a certain distance from the surface of the manuscript sheet, may be moved in the direction of the lines thereof and from one line to the next for scanning of the text in the ordinary manner of reading.

Still further objects and advantages will be apparent from the following description having reference to the accompanying drawings illustrating a preferred embodiment of the invention.

Figure 2:
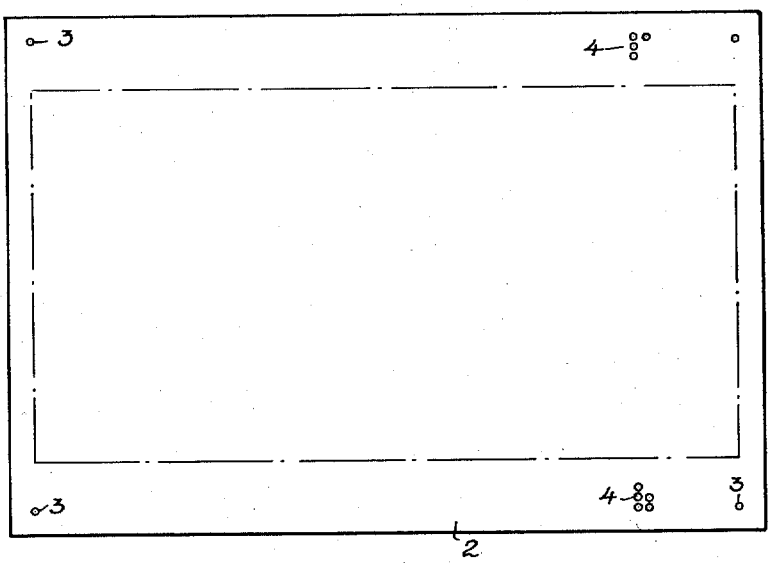
Figure 3:
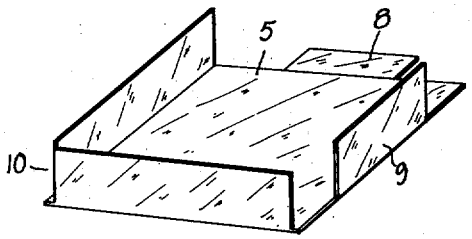
Figure 4:
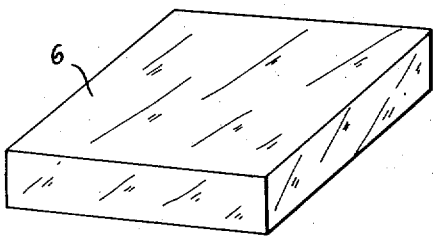
Figure 5:
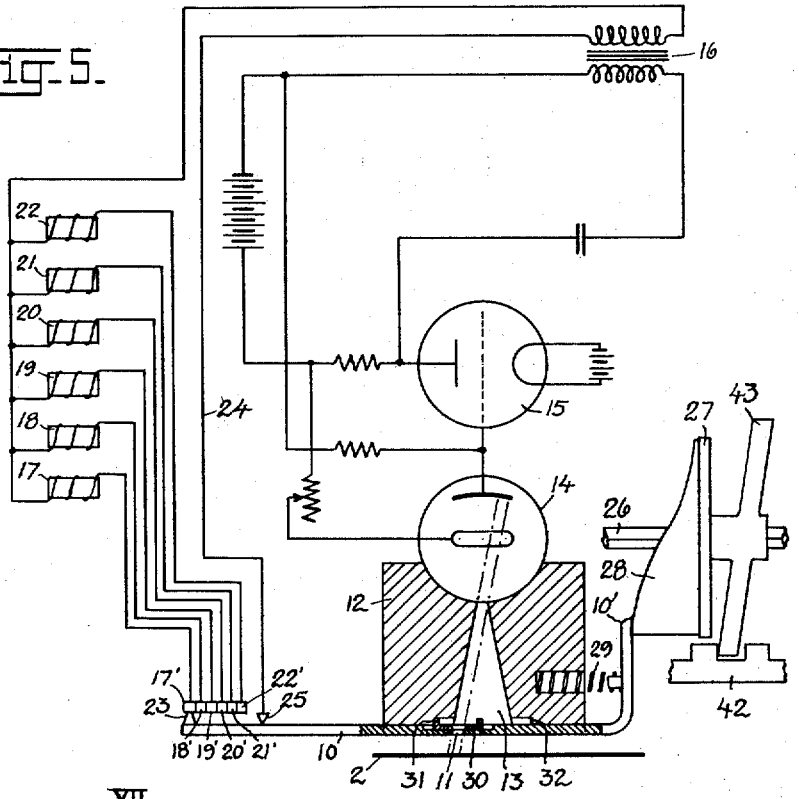
Figure 6:
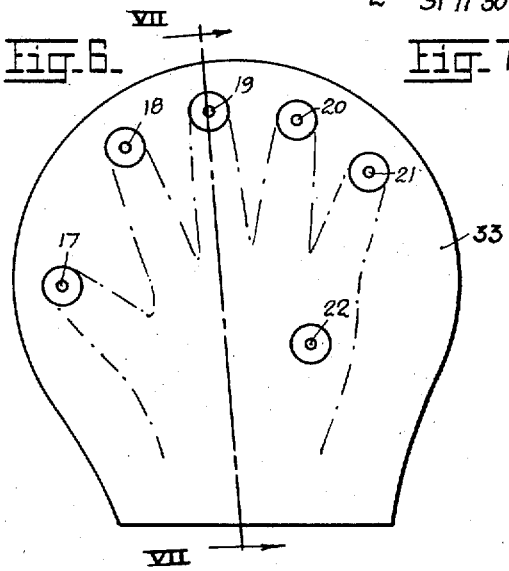
Figure 7:
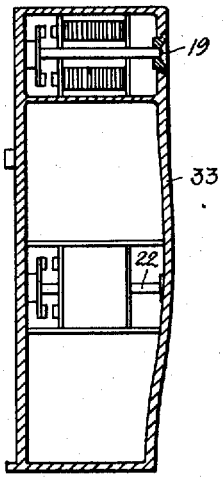
Figure 8:
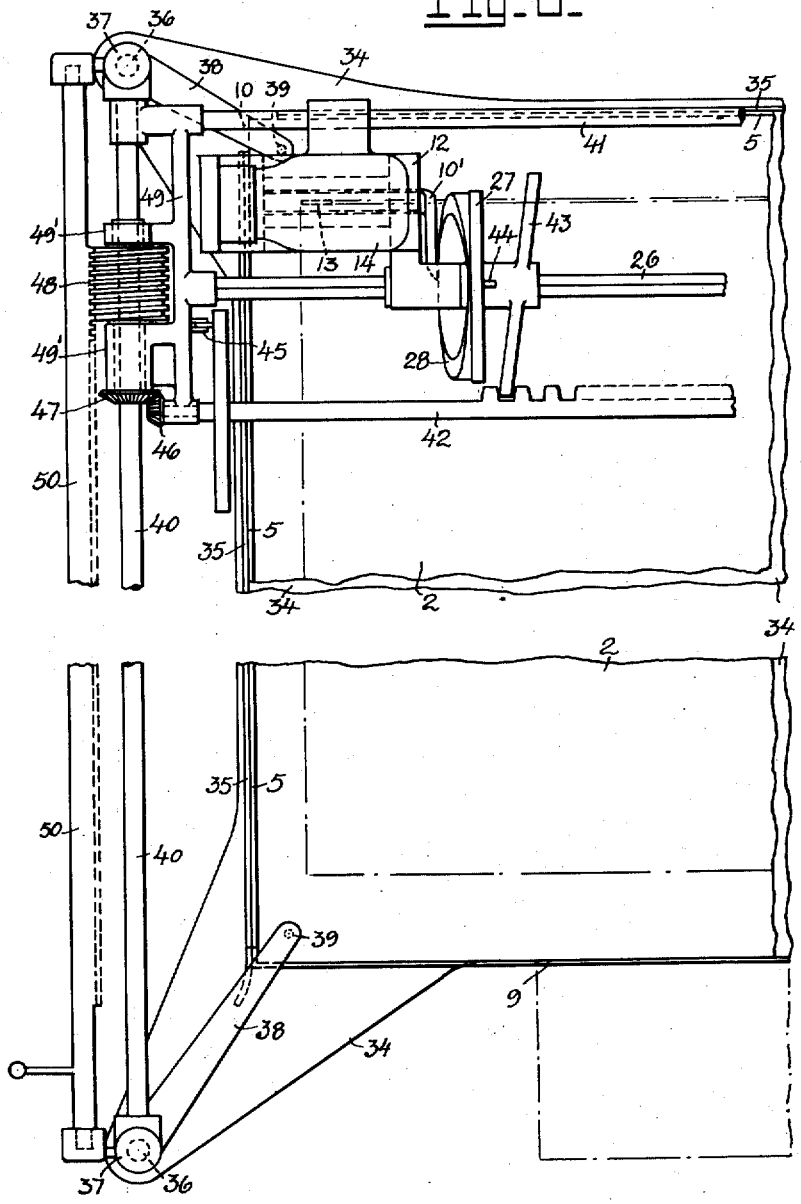
Figure 9:
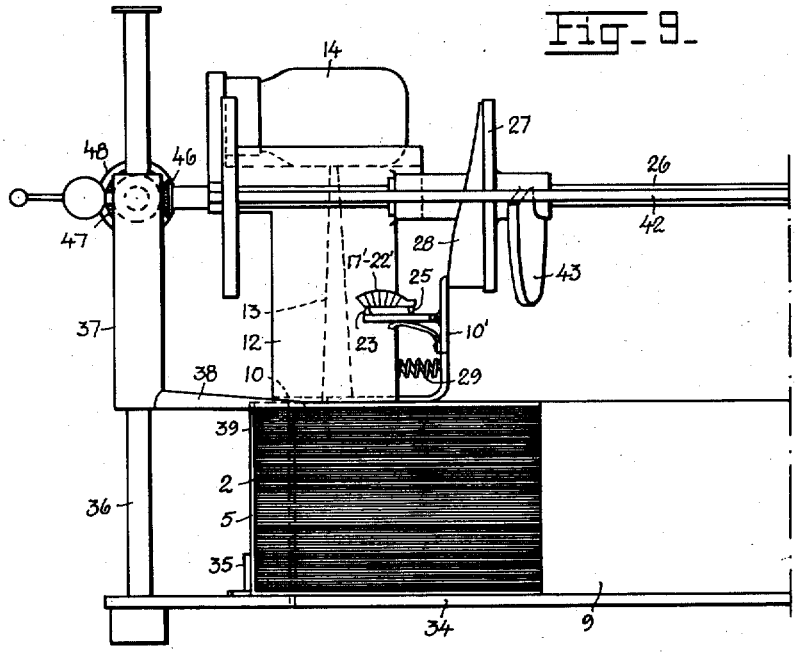
Figure 10:
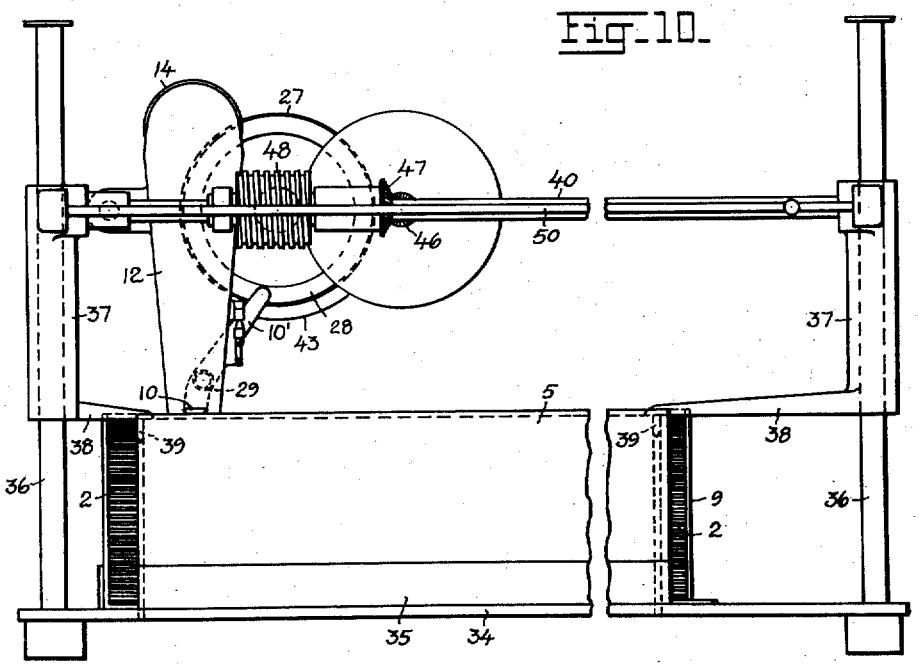

In the drawings:

Figure 1 shows a plan view of a part of a manuscript sheet,

Figure 2, a similar view of a complete sheet,

Figure 3, a perspective view of a cassette,

Figure 4, a similar view of the lid thereof,

Figure 5 shows diagrammatically the main parts and circuits of the scanning apparatus, Figure 6, a plan view of a touch apparatus, Figure 7 is a sectional view along the line VII—VII in Figure 6, Figure 8 is a plan view of one half of the scanning apparatus with parts broken away, Figure 9 shows a front view of the scanning apparatus, and Figure 10 shows an end view of the scanning apparatus.

The invention is based upon Louis Braille's point writing system in which six points in two parallel rows, each containing three points, are used to indicate the different letters, numbers, etc.

According to the invention said points are replaced by fields 1 placed in succession and in lines on a suitable sheet 2, for example of paper. Each of the fields 1 may have an area of about 1/32 square inch and be square or circular and for each letter there is arranged a group 1a of fields containing six close after each other following fields 1.

The leter formed or reproduced by each of the groups in accordance with said point writing system is marked so that those of the fields 1 of a group, which according to said system should represent points (in the following mentioned "effective fields") retain the light color of the paper sheet, or are provided with a light reflecting cover, while the remaining fields (in the following mentioned "ineffective fields") of said group are provided with a dark or poor light reflecting cover or print. By this arrangement the points of Braille's system are numbered in succession from one to six, the points in the first vertical row from below and upwards having number one to three and in the second row from above and downwards having number four to six.

Referring to Fig. 1, the top row of "fields," or "areas," is composed of six equal length and transversely extending adjacent portions 1a which, reading from left to right, are composed of equal size areas corresponding to the letters p, a, t, e, n, t. The first portion 1a is made up of four successive good light reflecting "areas," followed by two poor light reflecting areas. The second portion 1a is composed first by two poor light reflecting areas followed by one good light reflecting area and then by three poor light reflecting areas. The composition of the remaining portions is readily apparent from consideration of the drawing, it being noted that the third and sixth portions 1a are composed of like areas since both these portions correspond to the letter "T."

The groups 1a follow close after each other and it is not necessary, as later on will be apparent, to provide spaces between the words, but if so desired the words may be separated by a group 1a, which then contains only ineffective fields. The lines of groups are as shown placed close below each other without spaces.

The manuscript sheet above described may have any desired area, preferably standard dimensions, and may be produced by an ordinary printing operation, preferably with text on both sides, the ineffective fields being covered with printer's ink while the effective fields are retained uncovered, or alternatively, are covered with a coat of a good light reflecting substance.

Adjacent to the corners the sheets 2 are provided with apertures 3 by means of which they may be positioned on guiding pins in a scanning apparatus, and are further at the upper end provided with pagination 4 made by perforations according to the above described system and with sufficient distance between the perforations for the scanning thereof with a finger. The pagination is placed at some distance from the middle of the sheet in order to lighten the orientation of the sheets by the placing thereof within a keeping cassette or the like.

After the manuscript sheets have been printed they may be stiffened and reinforced by a coat of bright plastic material such as cellulose-acetate, Clorofoil, Bexoid, Tenite I or the like.

The keeping cassettes, which may be produced from thermoplastic or other suitable material consists of a lower part 5 and a lid 6. At one of the short and long sides, the lower part 5 is provided with side portions 8 and 9 respectively, which are hinged to the bottom and may be swung down into the plane of said bottom, and at the corner of the opposite side portions there is a cut away portion 10, the object of which will be explained below.

On one of the longitudinal sides of the lid the title of the manuscript is placed in relief, or in the form of perforation writing so that a blind person may "read" said title on the respective cassettes.

The main parts and coupling circuits of the scanning apparatus are shown diagrammatically in Figure 5.

The manuscript sheet 2 is supported on a suitable base, and at a certain distance, about 1/16 inch, above the same is arranged a screen 10 having an aperture 11 the area of which corresponds to the area of a field 1. The screen 10 is displaceably mounted at the lower side of a movable slide 12 adapted to be moved step-by-step in the longitudinal direction of the lines of the manuscript sheet 2. Each step of the slide corresponds to the length of a group 1a of fields containing one letter.

The slide 12 has a funnel-shaped channel 13 the lower opening of which has a cross sectional area corresponding to the area of a group 1a of fields and the upper opening of which corresponding approximately to the area of a single field and, is directed against a photo-cell 14 which is coupled to an amplifier circuit 15 which supplies the primary of a transformer 16, to the secondary of which are coupled, in parallel, six relays 17, 18, 19, 20, 21 and 22. Each of said relays is connected to a contact 17'—22', respectively, of a contact segment or row which is stationary with respect to the slide 12 and cooperates with a sliding contact 23, the contacts 17'—22' being arranged in the succession mentioned from left to right as shown in Figure 5. The contact 23 is mounted on the screen 10 which wholly or partly may be produced from electrically conducting material so that the return 24 may be connected thereto for example by means of a sliding contact 25.

The slide 12 with the photo-cell 14 is mounted for step-by-step movement by means of a suitable moving mechanism, across the sheet 2 with the lower opening of the channel 13, having its greatest dimension in the direction of movement, placed directly above a line so that this is followed from left to right. The length of each step of the movement corresponds, as above mentioned, to the length of the lower opening of the channel 13 which again corresponds with the length of a group 1a of a letter.

During scanning the slide 12 is moved forwardly one step during the first half of a revolution of a continuously rotating shaft 26 and is stationary during the second half thereof. On said shaft is mounted a disc 27 provided with a cam 28 against which an upwardly directed angle arm 10' on the screen 10 is pressed by means of a spring 29 placed between the slide 12 and said angle arm 10'. The cam 28 is so formed and placed that during said second half revolution of the shaft 26, when the slide is stationary, it gradually releases the screen 10 so that the screen, by the action of the spring 29, is moved towards the right (Figure 5), whereby the opening 11 passes six fields of the line on the manuscript 2. When the sixth field has been scanned, the shaft 26 moves the slide one step, corresponding to a new group of fields, at the same time as the cam 28 returns the screen 10, against the action of the spring 29, to the starting position shown in Figure 5. In order to prevent light impulses from being transmitted through the opening 11 to the cell 14 during forward movement of the slide and the coincident return of the screen in relation thereto, the screen is provided with a slidable damper 30 which, by cooperation with abutments 31, 32 on the slide 12, is moved to close the opening 11 when the last field of a group has been scanned and to hold said opening covered until the screen is returned to its starting position at which time the damper has been moved to uncover said opening 11.

Supposing that the manuscript shown in Figure 1 is positioned in the scanning device, with the slide placed at the beginning of the first line and with parts in the positions shown in Figure 5, light is reflected by the first effective field and acts upon the cell 14 whereby the current in the secondary of the transformer 16 is increased. In this position of the screen the contact 17' connects the relay 17 to the circuit whereby said relay is energized. The continuously rotating cam 28 allows the spring 29 to move the screen and thereby the opening therein to the second field and the sliding contact to the contact 18'. As this field also is effective, or reflecting, the relay 18 is energized and the same is repeated in connection with the third field. The fifth and sixth fields are, however, ineffective, or non-reflecting, and therefore not acting on the cell 14 so that the relays 21, 22 belonging to said fields will not be energized during the passing of the sliding contact 23 over the contacts 21' and 22' respectively.

A group of fields has now been scanned and the screen 10 has reached its right end position in which the damper 30 by the abutment 32 has been displaced so that it covers the opening 11. The shaft 26 now imparts to the slide a forward movement corresponding to a group 1a of fields at the same time as the cam 28 moves the screen 10 to its rearwardly starting position, in which the damper 30, by engaging the abutment 31, is so displaced that it uncovers the opening 11. The sliding contact 23 is now again placed on contact 17' as shown in Figure 5. By scanning of the next group of fields only relay 19 is energized, since the remainder of the fields are non-reflecting or ineffective.

When in this manner the whole of the line is scanned the slide 12 is continuously returned, either automatically, or by hand to the starting position at the left hand side of the sheet 2, and at the same time moved downwards corresponding to the distance between two lines that is corresponding to the height of a field.

The rate of motion of the slide 12 may be so adapted that, for example, five groups, that is five letters, are scanned per second.

The relays 17—22 are placed in a suitable touch apparatus 33 adapted as support for a person's hand so that the armature of the relay 17 is situated below the thumb, of 18 below the forefinger, of 19 below the middle finger, of 20 below the ring-finger, of 21 below the little finger and of 22 below the palm of the hand as shown in Figure 6.

When the scanning takes place as above described, in connection with the first group the armatures of the relays 17, 18, 19 and 20 are forced upwardly in the mentioned succession and notify that said group contains the letter p. In connection with the second group only relay 19 is energized and represents the letter a, with the third group the relays 18, 19, 20 and 21 representing the letter t and so on.

As will be understood in this manner a blind person may read the manuscript only by placing the hand on the touch apparatus, the relays of which impart to the hand tangible impulses in a succession which corresponds to the points of Braille's point writing system numbered as above mentioned.

Owing to the step by step movement of the slide 12 during cooperation with the screen 10 and the contact row, the impulses for each letter always arrive in the fixed succession in the row of relays, as this is coupled in the same relation to each of the groups during the scanning thereof. For that reason the delivering of impulses in response to the effective fields of each single letter always starts from the left, from relay 17, i.e. from the thumb of the hand lying on the touch apparatus, and thereby a perceptible distinction arises between the single letters and also between the single words, so that special fields therefore, which fields in the event had to be six in number, will not be necessary.

The light reflected by the effective fields may be day light or light from another suitable source the light rays of which have access to the space between the sheet 2 and the screen 10.

A preferred embodiment of the scanning apparatus is shown in Figures 8, 9 and 10. Said apparatus comprises a base plate 34 having guiding ribs or walls 35 by which the cassette 5, containing the manuscript sheets 2, may be positioned in correct position. At each of the corners of the plate 34 are secured vertically directed posts or rods 36 on each of which is slidably mounted a sleeve shaped member 37 having an inwardly directed arm 38 provided with a tap 39 adapted to be inserted in the adjacent aperture 3 in the manuscript sheets 2 so that these are held in correct position. The said arms 38 have access to the interior of the cassette 5 through the cut away portions 10, as shown.

The sleeve members 37 at each side of the plate 34 are rigidly interconnected by a rod 40; said rods serve as guides for displaceably arranged carriage members 49 interconnected by a rod 41, a driving shaft 26 and a rotatably mounted rack 42, said members forming together a carriage which is movable in the direction of the height of the manuscript sheet.

The slide 12 is slidably supported on the rod 41 and the shaft 26 and has step by step movement imparted thereto by means of a disk 43 the circumference of which has the shape of one half of a screw thread. Said disc 43, which cooperates with the rack 42, is rigidly connected with the cam disc 27, which is rotatably but not displaceably connected to the slide 12. When the shaft 26 is rotating the disc 43 during one half of a revolution thereof engages the rack 42 and moves the slide 12 towards the right a distance corresponding to a group 1a of fields as previously mentioned.

Simultaneously with this movement of the slide, the cam 28 returns the screen 10 to its starting position in relation to the slide 12 against the action of the spring 29. During the second half of the said revolution of the shaft 26, when the disc 43 is out of engagement with the rack 42, the cam 28 permits the spring 29 to move the screen 10 towards right for the scanning of a further group 1a.

The sleeve members 37 and the carriage supported thereby are supported by the arms 38 on the upper sheet 2 of the pile of sheets in the cassette 5 so that the distance between said sheet and the screen 10 is always constant.

When a row of portions 1a has been scanned and the slide 12 arrives at the right hand end of the carriage a tap 44 on cam disc 27 acts upon the control member (not shown) of a power source driving the shaft 26 and disconnects the drive so that shaft 26 stops. Thereafter rack 42 is rotated one revolution by means of the handle 45 secured thereon and the slide returned by hand to the starting position at the left hand end of the rod. On each end of the rack 42, which is rotatably supported in the carriage, is secured a bevel gear 46 which meshes with a bevel gear 47 secured on a screw 48 rotatably supported on the carriage rod 40 between bearings 49' on the member 49. Said screw 48 engages with a rack 50 arranged parallel with the rod 40 so that when the rack 42 rotates one revolution the screws 48 move the carriage downwards a distance corresponding to the distance between two lines of the manuscript. The scanning of the next line may thereafter be effected in similar manner as above described.

When in this manner the last line of the manuscript has been scanned, the carriage is elevated, the sleeve members 37 being then guided on the vertical rods 36, whereupon the upper sheet 2 is removed or turned.

The power source for the operation of the shaft 26 may be a spring or an electric motor.

The main advantages of the system above described in comparison with the usual point writing system are obvious. The manuscript may be produced by usual printing methods and are of smaller volume than a corresponding manuscript in book print. The manuscripts may be deposited in cassettes and placed in a shelf from which a manuscript may be removed and placed in the scanning or reading apparatus.

The reading may be carried out rapidly and without effort, as it takes place after the previously learned writing system, at the same time the produced impulses have such effect that the sensibility, which is of importance for the reading of usual point writing, is now of no consequence.

As will be understood the details of the system may be varied in many ways without departing from the scope of the invention.

I claim:

1. In apparatus for enabling blind persons to read from sheets containing lines of indicia according to the Braille system extending transversely across the sheets, with each line containing successive equal length portions containing light reflecting areas corresponding to the points of the Braille convention, frame structure including a base for supporting a said sheet flatwise thereon in a stationary position, a scanning device comprising a combination photo-cell and slide, means mounting said photo-cell and slide upon said frame structure in position above said sheet, means connected with said combination photo-cell and slide for transmitting step-by-step motion thereto in the direction of said lines from end to end of the lines, each said movement of said combination photo-cell and slide being an extent corresponding to the length of said equal length line portions, means for moving said combination photo-cell and slide perpendicularly with respect to said lines for enabling the scanning device to scan successive lines of said sheet, said slide having a light transmitting channel exposed to said sheet and to said photo-cell, a screen having an aperture corresponding in shape and size to a said light-reflecting area of said sheet, said screen carrying an electrical contact, means mounting said screen upon said slide between said sheet and slide in spaced relation to the sheet, means connected with said screen for imparting successive back and forth reciprocatory motion thereto an extent corresponding to each said equal length line portion, electrical means connected with said photo-cell and including a six point contact assembly and a touch sensitive device with which a person's hand is engaged for receiving impulses in accordance with the Braille convention by the passage of said screen contact over said contact assembly, and means controlling said screen motion so that the screen is displaced from a starting position in the direction of scanning while said slide is stationary and is returned to said starting position when said slide is moved.

2. Apparatus as claimed in claim 1, said channel in said slide being of funnel shape and having one end of shape and size corresponding to a said light reflecting area of said sheet and its opposite end of shape and size corresponding to a said equal length line portion, said screen being mounted against the end of said slide containing the large size end of said channel, a shutter mounted for sliding motion on said screen and with respect to said screen aperture, and means cooperable between said shutter and slide for moving said shutter to closed position with respect to said aperture during movement of the screen to its starting position.

3. Apparatus as claimed in claim 1, said frame structure including vertical posts at the four corners of a rectangle, said posts being interconnected by shaft structure extending in right-angle relation, said mounting means for said combination photo-cell and slide and for said screen including means slidably engaged with said shaft structure for guiding said combination photo-cell and slide and said screen for motion in either direction of said shaft structure.

4. Apparatus as claimed in claim 1, said frame structure including vertical posts at the four corners of a rectangle, said posts being interconnected by shaft structure extending in right-angle relation, said mounting means for said combination photo-cell and slide and for said screen including means slidably engaged with said shaft structure for guiding said combination photo-cell and slide and said screen for motion in either direction of said shaft structure, said posts carrying swingable arms having means engageable with openings at the corner of a said sheet for maintaining said sheet in scanning position.

5. Apparatus as claimed in claim 1, said means for transmitting step-by-step motion to said combination photo-cell and slide including a rotatable shaft carrying a cam, spring means connected between said slide and screen for normally urging said screen to its starting position, said screen including a portion in engagement with said cam and said cam being formed so that during one half revolution of said shaft the said screen is moved forward from its starting position against the action of said spring while during its next half revolution the screen is allowed to return to its starting position by the action of said spring.

*6. In an apparatus for enabling blind persons to read from individually prepared manuscript sheets adapted for stacking and each having arranged thereon a plurality of parallel successive lines of letter-indicating groups of indicia with each group including a plurality of contrasting fields; the combination comprising supporting frame means, means supporting a manuscript sheet in predetermined fixed position on said supporting frame means, a scanning device movably carried by said supporting frame means in position for scanning the lines of letter-indicating groups of indicia on a fixed manuscript sheet positioned adjacent thereto and said scanning device carrying means relatively movable with respect thereto and successively responsive to the contrast of each of said contrasting fields, means for moving the scanning device along a line of letter-indicating groups of indicia to scan in turn the fields of each of the groups in a line, electrical means connected to said scanning device for converting the responsive output thereof to electrical impulses, and a touch assembly arranged to receive the electrical impulses and to present signals indicative thereof in a six-point configuration related to the Braille writing system.*

*7. In an apparatus as claimed in claim 6, wherein there is provided means for shifting the scanning device transversely of the supporting frame means to a position for scanning the next adjacent successive line of letter-indicating groups of indicia.*

*8. In an apparatus as claimed in claim 6, wherein the scanning device includes a photocell responsive to the contrast of said contrasting fields.*

*9. In an apparatus for enabling blind persons to read from individually prepared manuscript sheets adapted for stacking and each having arranged thereon a plurality of parallel successive lines of letter-indicating groups of indicia with each group including a plurality of contrasting fields; the combination comprising supporting frame means, means supporting a manuscript sheet in predetermined fixed position on said supporting frame means, a scanning device movably carried by said supporting frame means in position for scanning the lines of letter-indicating groups of indicia on a fixed manuscript sheet positioned adjacent thereto and carrying relatively movable means successively responsive to the contrast of each of said contrasting fields and including an apertured slide shiftable over the contrasting fields of each group in succession and with the aperture corresponding in size to the area of each group, means for moving the scanning device along a line of letter-indicating groups of indicia to scan in turn the fields of each of the groups in a line, electrical means connected to said scanning device for converting the responsive output thereof to electrical impulses, and a touch assembly arranged to receive the electrical impulses and to present signals indicative thereof in a six-point configuration related to the Braille writing system.*

*10. In an apparatus as claimed in claim 9, wherein a screen associated with the slide is apertured according to the size of each field and is shiftable relative to the slide over each field in the particular group being scanned.*

References Cited in the file of this patent or the original patent

UNITED STATES PATENTS

| | | |
|---|---|---|
| 1,149,547 | Tideman | Aug. 10, 1915 |
| 1,453,741 | Brodeur | May 1, 1923 |
| 1,487,115 | McQuarrie | Mar. 18, 1924 |
| 1,790,985 | Grondahl | Feb. 3, 1931 |
| 1,889,576 | Snook | Nov. 29, 1932 |
| 2,432,123 | Potter | Dec. 9, 1947 |
| 2,518,694 | Jannopoulo | Aug. 15, 1950 |
| 2,521,338 | Bryce | Sept. 5, 1950 |
| 2,549,632 | Nottingham | Apr. 17, 1951 |

FOREIGN PATENTS

| | | |
|---|---|---|
| 186,686 | Great Britain | Oct. 2, 1922 |